(No Model.)
J. E. VAN NOSTRAN.
HAY RAKE AND LOADER.
No. 538,394. Patented Apr. 30, 1895.
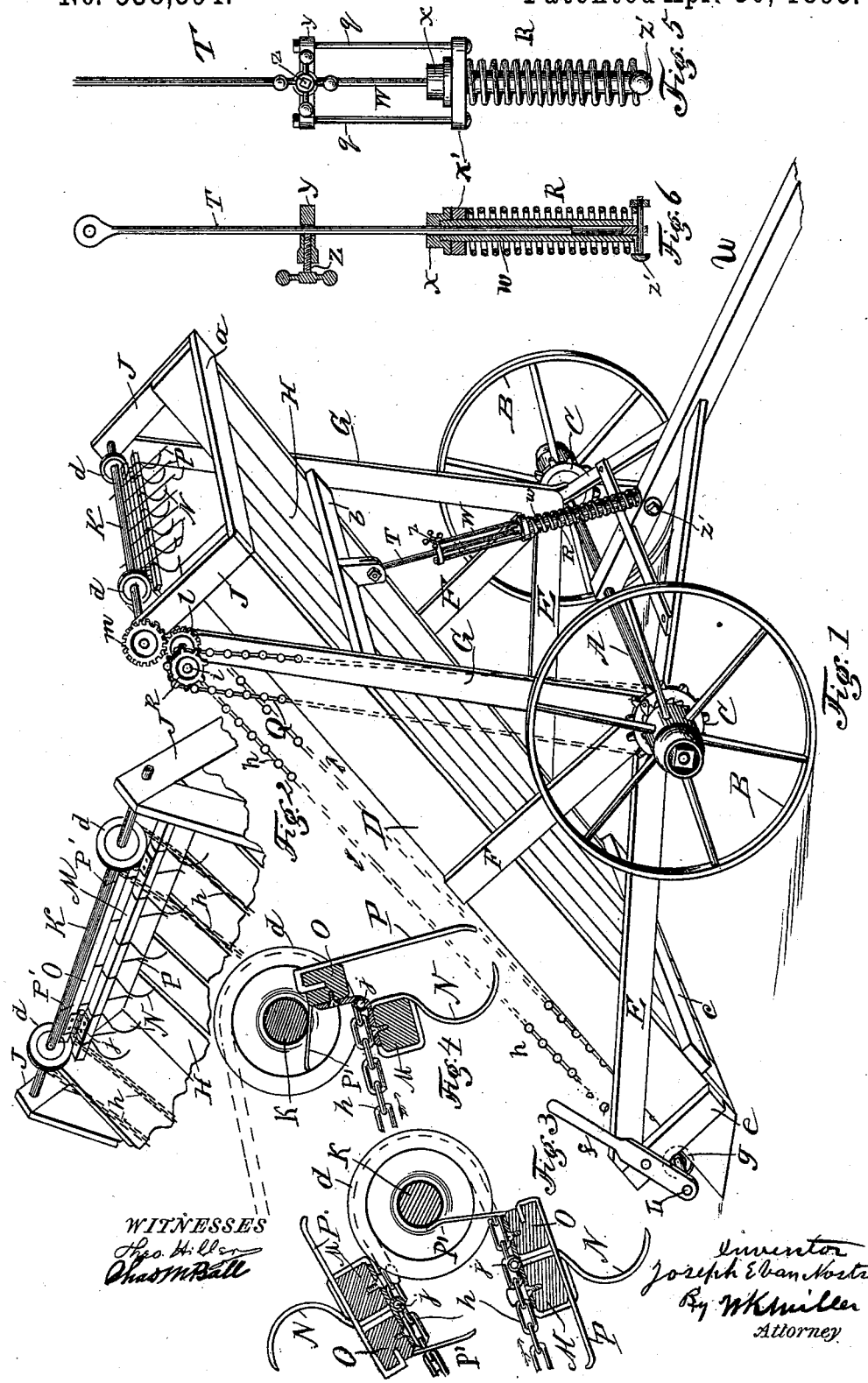
WITNESSES
Inventor
Joseph E Van Nostran
By W K Miller
Attorney

UNITED STATES PATENT OFFICE.

JOSEPH E. VAN NOSTRAN, OF CANTON, OHIO.

HAY RAKE AND LOADER.

SPECIFICATION forming part of Letters Patent No. 538,394, dated April 30, 1895.

Application filed January 7, 1895. Serial No. 534,029. (No model.)

*To all whom it may concern:*

Be it known that I, JOSEPH E. VAN NOSTRAN, a citizen of the United States, and a resident of Canton, county of Stark, State of Ohio, have invented a new and useful Improvement in Hay Rakes and Loaders, of which the following is a full, clear, and exact description, reference being had to the accompanying drawings, making part of this specification.

My invention relates to improvements in hay rakes and loaders; and consists of certain features of construction and combination of parts, as will be hereinafter described and pointed out in the claims.

Figure 1 of the accompanying drawings is a perspective illustrating the invention. Fig. 2 is a similar view of the upper end portion of the carrier. Fig. 3 is a side view showing the rake as seen when approaching the upper end of the machine, the trip of the cleaner about to engage the upper shaft, and a rake after having been relieved of its load, the stripper being folded back over the rake. Fig. 4 shows the parts in the act of dumping the hay. Fig. 5 is a front elevation of a spring support by which the rake is held to and allowed to follow the undulations of the ground. Fig. 6 is a vertical section of the same.

A denotes the axle on which is secured sprocket wheels C, with which the drive wheels B have a pawl engagement as shown in Fig. 1, and will need no explanation.

The frame is constructed substantially as shown, having side boards D and supports E, F and G, that radiate from the axle A, support E secured to the lower end of the side board D, E to the middle portion and G to the upper portion. The bottom boards H are supported on the cross pieces $a$, $b$, $c$.

At the upper end of the trough formed by the parts mentioned in the foregoing paragraph, are provided standards J, that form a support for the cross shaft K, on which are mounted chain wheels $d$, and at the lower end of the trough are provided standards $e$, to which are pivotally secured levers $f$, that support a cross shaft L, on which are mounted chain wheels $g$, that correspond with the wheels $d$, on shaft K. About the wheels $d$ and $g$, is placed a suitable chain as $h$, to which the rake heads M are secured at desired intervals, as shown in Fig. 3, which serve to support the spring teeth N. To the head M is hinged by hinge $j$, a similar head O, to which is secured a stripper P, and a trip P'.

From the upper end of the support G, is projected a stud pin $i$, on which is supported a sprocket $k$, and gear wheel $l$, which are cast integral, the latter having engagement with wheel $m$, mounted on the end of shaft K. A sprocket chain Q connects the sprocket wheel C on the axle A and the wheel $k$, by which motion is communicated from the axle A to the shaft K.

To support the front end of the trough and cause the lower end of the trough to follow the undulations of the ground a spring as R is provided, one end of which rests on the tongue U, the other to take under the cross head $x'$. Inside of the spring R, is provided a pipe or cylinder portion $w$, the lower end of which is pivotally secured to the tongue by the bolt $z'$, and at the upper end is provided a cap or check nut $x$. The rod T is pivotally secured to cross piece $b$, under the trough. The lower or free end of the rod is passed through the frame W, formed by the heads $y$, and $x'$, and the side bars $q$, through the nut or cap $x$ into the tube $w$. To adjust the pressure of the spring to be exerted between the trough and the tongue, the frame W is moved up or down on the pipe $w$, and rod T, and secured to the rod by the set screw $z$.

In operation the chains $h$ are rotated about the chain wheels in the direction indicated by the arrow, by which the rakes are brought down to the ground to gather the hay and draw it up over the bottom of the trough, to the upper end thereof, at which point the trip P', will engage the shaft K to turn the stripper P out, as shown in Fig. 4, to discharge the hay from the rakes.

Having thus fully described the nature and object of my invention, what I claim, and desire to secure by Letters Patent, is—

1. The combination in a hay loader, of the supporting and driving wheels, of the cross shafts K and L, elevator chains $h$, to which are secured rake heads, M, rakes N, stripper head O, hinged thereto, the stripper P and trip P', substantially as described and for the purpose set forth.

2. The combination in a hay loader, of the supporting and driving wheels and the trough, of the chain $h$ the rake head M secured thereto, teeth secured to the head, and a rake stripper support carried by said chain in advance of the rake head said stripper having a trip P' to engage a shaft or cross bar, whereby the stripper support is rocked to throw the stripper forward to remove the hay from the rake, substantially as described and for the purpose set forth.

3. The combination in a hay loader, of the trough and tongue, of an adjusting mechanism, comprising the spring R, cylinder $w$, rod T, cross heads $y$ and $x'$, and means for securing the parts in desired adjustment, substantially as described and for the purpose set forth.

In testimony whereof I have hereunto set my hand this 15th day of December, A. D. 1894.

JOSEPH E. VAN NOSTRAN.

Witnesses:
W. K. MILLER,
BURT A. MILLER.